UNITED STATES PATENT OFFICE.

ALBERT E. GREENE, OF CHICAGO, ILLINOIS.

COMBINED PROCESS OF REFINING METAL AND REDUCING ORE.

1,185,397.      Specification of Letters Patent.      Patented May 30, 1916.

No Drawing.      Application filed December 27, 1912. Serial No. 738,838.

*To all whom it may concern:*

Be it known that I, ALBERT E. GREENE, citizen of the United States, residing at Chicago, in the county of Cook and State of Illinois, have invented certain new and useful Improvements in Combined Processes of Refining Metal and Reducing Ore; and I do hereby declare the following to be a full, clear, and exact description of the invention, such as will enable others skilled in the art to which it appertains to make and use the same.

My present invention relates to iron refining processes, particularly for the removal of impurities such as phosphorus and sulfur and to the production of refined ferrometals and of metals of similar nature to iron.

My process is an improvement over the so-called "pig and ore" process of making steel. It is based on the fact which I have discovered, that a reducing gas, such as ordinary producer gas, can be made to reduce oxid of iron without reducing calcium phosphate contained in the same charge with the oxid of iron, and one object of my process is to rapidly and completely reduce the iron oxid in a process of treating impure pig iron and iron ore so as to leave the impurities phosphorus and sulfur both in the slag.

An important feature of this process is the method of accelerating and completing the reactions, namely, the reduction of metallic oxid and the oxidation of the phosphorus contained in the metal, (1) by the continuous removal of the gaseous oxidation products of the reactions in a current of reducing gas passed continually through the furnace during the process, and (2) by the reaction of the reducing gas itself to reduce the oxid of the metal in the ore and slag. It is essential that the equilibrium conditions in the furnace atmosphere covering the charge be continually such as to carry to completion the reaction between the metallic oxid and the agents acting thereon. Herein lies the essential difference between this process and the basic open-hearth process,—namely, that although reducing gas passes continually through an open-hearth furnace, yet the equilibrium conditions therein are never such as to cause a rapid or complete reduction of the metallic oxid in the slag, since those equilibrium conditions are the result of combustion of that reducing gas with air entering therewith and an excess of air is necessary to burn the gas to obtain sufficient heat, and the result is that the steel so made requires deoxidation by special agents, and, in many cases, requires the removal of the slag which contains considerable amounts of oxid of iron. It has been proposed by De Ferranti, U. S. Patent No. 969,261, to burn reducing gas with air in an electric furnace to remove the phosphorus from a bath of iron according to basic open-hearth reactions. Such reactions in this electric process differ in no essential way from those in the ordinary open-hearth furnace heated by combustion, and the burning of the reducing gas results in equilibrium conditions in the furnace chamber which prevent the accomplishment of the objects of applicant's invention, namely, the separation of phosphorus as a calcium compound in the slag and the simultaneous reduction of the metallic oxid like iron out of the slag.

One object of my invention is to accomplish the removal of phosphorus from a bath of iron or steel in a rapid and efficient manner and at the same time to avoid the costly and difficult removal of the slag and loss of iron oxid which is ordinarily present in other processes.

In one modification, my process involves the treatment of molten high phosphorus pig iron with lime and iron-ore, while heating the charge with electric heat, and meanwhile acting on the metal and slag with reducing gas. This treatment results in an efficient elimination of both the sulfur and the phosphorus and also a rapid reduction of the oxids of iron and manganese, and thus yielding a high metal efficiency as well.

My process depends on the use of electric heat as the only practical means of maintaining the temperature, since the reactions of the process, namely the reduction of iron oxids to completion and simultaneous formation of calcium phosphate from the lime and phosphorus and oxygen, will not take place in the atmosphere of an open hearth furnace heated by combustion as the only source of heat. The atmosphere must be continually reducing toward the oxids of iron or similar oxids.

My process is applicable to the production of refined ferro-metals in general such as low-phosphorus steel, low-phosphorus ferro-manganese, or similar alloys, or to low-phosphorus alloy steels, and the like. As one modification, it may be practised to remove the phosphorus without removing the carbon to any great extent so that the latter may be removed subsequently in any desired way. However, I prefer to carry out the process to completion, removing both phosphorus and carbon, the latter usually last. My process is equally applicable for the removal of phosphorus from iron containing a low percentage of carbon, including steel, or from iron containing a high percentage of carbon, such as cast-iron. The process may be applied to iron from which the carbon has been removed, in which case a higher temperature is necessary.

One advantage of my process is the removal of metallic oxids from the slag whereby desulfurization in the basic slag is facilitated under the reducing conditions.

To carry out one modification of my process for the treatment of high-phosphorus pig iron and reduction of high-phosphorus iron-ore a type of hearth furnace is used which may be heated by both gas or oil and also electrically. An ordinary electric arc furnace fitted with an oil burner and with twyers blowing down on the metal and ore will serve. A weight of ore is charged such as will furnish the necessary amount of oxygen to oxidize the impurities, together with enough lime to flux the phosphorus oxid and silica, and this is heated to about redness with the oil. The pig iron is then charged and the oil heat stopped. Electric heating is begun and ordinary producer gas is blown into contact with the slag and preferably also into contact with the metal and through the furnace chamber. The producer gas may analyze 25% CO, 4% H, 5% $CO_2$ and the balance nitrogen, with small amounts of hydro-carbon; or the carbon dioxid may be as high or higher than blast furnace producer gas which may contain as much as 12% to 15% $CO_2$. The action of the gas is to complete the reduction of the ore without reducing the phosphates therein which combine with lime and form a slag. The gas also acts together with the metallic oxids in the slag to decarburize and to dephosphorize the metal. The temperature, of course, determines whether dephosphorization or decarburization goes on most rapidly.

The essential difference between this process and other is the combined use of oxid ore and a reducing gas under reducing conditions, and I find that the time of reaction is greatly diminished by this process. My explanation of the reactions involved is as follows:—Phosphorus in the molten pig iron readily combines at low temperatures slightly above the melting point of the iron with oxygen of the ore and lime, and further aided in this by the oxygen dissociated from the producer gas used. The presence of the reducing components of the gas, such as the CO, reduces the oxids of iron and manganese, but not the phosphorus which slags with lime as phosphate without being reduced. The reduction of iron and manganese oxids is practically complete. The reducing gas has a marked quieting effect on the frothiness of the slag ordinarily met with in the open hearth process.

After slagging of the phosphorus, the decarbonizing of the metal may be completed with the aid of the producer gas and an elevated temperature maintained electrically. The slag which holds the phosphorus, being free from oxid of iron, readily takes up and holds sulfur so that iron and ore containing sulfur may be readily treated by this process, and the gas may be made from fuel above the ordinary limits in sulfur.

My process is particularly applicable to iron-manganese alloys, such as ferro-manganese, high in phosphorus and to pig iron high in manganese where the manganese is desired retained.

To apply my process to the dephosphorizing of ferro-manganese, a charge of impure alloy is provided in a suitable furnace, such as an induction furnace, and manganese ore and lime, added thereto. The mixture is then heated and a producer gas blown preferably around an arc terminating on the ore and flux at the surface of the metal bath. The action is in every way similar to that described for iron. The temperature of the metal need not be, and preferably is not, maintained as high as when dephosphorizing low-carbon steel. The gas composition may vary considerably, but ordinary producer gas will serve. This usually contains 15 to 30% CO, 5 to 10% $CO_2$, and some hydrogen and hydrocarbons, etc. Silicon may be removed in exactly the same way as phosphorus.

By the term ferro-metals, it is understood that I mean iron and iron alloys and metals of similar nature to iron with respect to carbon and phosphorus. Nor is my invention limited to any particular flux.

It is understood that the amount of metallic oxid or ore used may be varied according to the conditions and any suitable grade of oxid such as iron scale may be employed. The flux may be either limestone or burnt lime or other similar flux. It is also understood that the process may be applied either during melting or after melting of the metallic charge.

By the process of this invention phosphorus is removed from the iron or other metal as a slag compound of calcium, generally as calcium phosphate, but it is understood that the process of this invention may result in other compounds of phosphorus than calcium phosphate, provided the phosphorus does not return to the metal.

What I claim is:

1. The process which consists in treating a charge of phosphorus-containing pig iron together with iron ore and a flux containing lime under electric heat, and maintaining the atmosphere in contact with the charge continually reducing toward oxid of iron, passing a gas continually through the furnace during the process and removing the gaseous products of oxidation, said gas having reducing properties toward oxid of iron but incapable of causing the phosphorus to return to the metal.

2. The process of refining ferro-metals containing phosphorus, said process consisting in oxidizing the phosphorus by means of oxid of the metal in the presence of lime, and completing the reduction of the metallic oxid by maintaining the atmosphere in the furnace continually reducing toward the metallic oxid by forcing in reducing gas, removing the gaseous oxidation products in said gas without causing the phosphorus to return to the metal.

3. The process of refining an iron-manganese alloy containing phosphorus, which consists in reacting on the molten metal with an oxid of one of the metals iron or manganese in an electrically heated furnace in the presence of lime, and meanwhile continuously maintaining the gaseous atmosphere in the furnace chamber reducing toward oxid of iron by forcing in a fresh supply of reducing gas, said gas being incapable of causing the phosphorus in the slag to return to the metal.

4. The process of refining pig iron, consisting in heating iron ore and a flux containing lime in a furnace which may be heated electrically, charging into the furnace molten pig iron, together with the ore and flux, and then, while heating the mixture with electric heat, forcing in a reducing gas having reducing properties for oxid of iron but not for the ultimate slag compound holding the phosphorus so as to continually maintain the atmosphere reducing toward the oxid of iron and removing the gaseous products of oxidation until such oxid is practically all reduced and the phosphorus and sulfur left in the slag.

5. The process of producing steel, which consists in charging pig iron into an electric furnace together with iron ore and flux containing lime, whereby the iron ore is reduced and the phosphorus and carbon in the pig iron oxidized, and, while electrically heating the charge, forcing reducing gas into the furnace chamber and continually maintaining the atmosphere reducing toward the oxid of iron and practically completely reducing such oxid which would otherwise remain unreduced in a furnace heated by combustion, by removing the gaseous oxidation products in the current of gas, said gas being incapable of causing the phosphorus to return to the metal from the slag.

6. The process which consists in electrically heating a charge of impure iron, an oxid of iron, and a flux containing calcium oxid to an elevated temperature at which the oxid reacts on the phosphorus causing it to form a slag compound with calcium oxid, maintaining a reducing atmosphere covering the charge, and removing the gaseous oxidation products in a current of reducing gas passed continuously through the furnace, said gas having reducing properties for oxid of iron but not such as to cause the phosphorus to return to the metal.

7. The process of refining impure iron containing phosphorus and carbon, which consists in making a charge of suitable proportions of iron, a compound containing an oxid of iron and a flux containing lime, electrically heating to an elevated temperature suitable for oxidizing the impurities, and, while maintaining the temperature electrically, covering the charge with an atmosphere of reducing gas, continuously passing ordinary producer gas through the furnace chamber and removing the gaseous oxidation product until the desired degree of refining is reached.

8. The process of refining a charge of iron containing phosphorus and carbon, which consists in electrically heating to an elevated temperature the iron together with iron ore and a flux containing lime, maintaining a reducing gas covering over the charge, causing a current of reducing gas having reducing properties for the oxid of iron but not for the desired slag compound of phosphorus to pass through the furnace and remove the gaseous products of oxidation, and reduce the iron oxids in the slag.

9. The process of refining an impure iron containing phosphorus and carbon, which consists in subjecting the metal, electrically maintained at an elevated temperature, to the action of oxid of iron together with a flux containing lime, maintaining a reducing atmosphere over the charge, regulating the temperature to oxidize the impurities in the desired order and meanwhile passing through the furnace a gas having reducing properties toward oxid of iron but not toward the desired slag compound of phosphorus.

In testimony whereof I affix my signature in presence of two witnesses.

ALBERT E. GREENE.

Witnesses:
RUTH C. McDONNELL,
K. WALLACE.